(12) United States Patent
Pantel (10) Patent No.: US 11,853,939 B2
(45) Date of Patent: Dec. 26, 2023

(54) SYSTEM AND METHOD FOR EVALUATING SOLAR INSTALLATION PLANS, STRUCTURAL AND ELECTRICAL ANALYSES, AND PERMIT PREPARATION

(71) Applicant: Richard Joseph Pantel, Round Hill, VA (US)

(72) Inventor: Richard Joseph Pantel, Round Hill, VA (US)

( * ) Notice: Subject to any disclaimer, the term of this patent is extended or adjusted under 35 U.S.C. 154(b) by 0 days.

(21) Appl. No.: 17/508,244

(22) Filed: Oct. 22, 2021

(65) Prior Publication Data
US 2023/0131463 A1   Apr. 27, 2023

(51) Int. Cl.

| | | |
|---|---|---|
| *G06Q 10/0631* | (2023.01) | |
| *G06Q 10/10* | (2023.01) | |
| *G06Q 30/018* | (2023.01) | |
| *G06Q 50/08* | (2012.01) | |
| *G06F 16/245* | (2019.01) | |
| *H04L 9/40* | (2022.01) | |
| *H04L 9/32* | (2006.01) | |

(Continued)

(52) U.S. Cl.
CPC ..... *G06Q 10/06313* (2013.01); *G06F 16/245* (2019.01); *G06F 30/13* (2020.01); *G06Q 10/103* (2013.01); *G06Q 30/018* (2013.01); *G06Q 50/08* (2013.01); *H04L 9/3247* (2013.01); *H04L 63/08* (2013.01); *G06Q 50/06* (2013.01); *G06Q 2220/10* (2013.01); *H02S 20/23* (2014.12)

(58) Field of Classification Search
CPC ........ G06Q 10/00; G06Q 10/02; G06Q 10/03; G06Q 10/10; G06Q 10/06313; G06Q 10/06316; G06Q 10/103; G06Q 30/02; G06Q 30/018; G06Q 50/06; G06Q 50/08; G06F 16/245; G06F 30/13; G06F 2220/10; H04L 30/08; H04L 9/3247; H02S 20/00; H02S 20/32; H02S 20/22–25
See application file for complete search history.

(56) References Cited

U.S. PATENT DOCUMENTS

| | | | |
|---|---|---|---|
| 10,754,999 B1 * | 8/2020 | Vratimos | ................ F24S 90/00 |
| 2010/0217724 A1 * | 8/2010 | Wayne | ................ G06Q 50/165 |
| | | | 705/348 |

(Continued)

OTHER PUBLICATIONS

Stowell et al., A harmonized, high-coverage, open dataset of solar photovoltaic installations in the UK, Nov. 13, 2020, Scientific Data, pp. 1-15 (Year: 2020).*

(Continued)

*Primary Examiner* — Robert D Rines
(74) *Attorney, Agent, or Firm* — Maier & Maier, PLLC (57) ABSTRACT

A system and method for preparing structural analyses for solar installation projects, designing photovoltaic solar electrical systems and thermal solar systems processing solar installation plans, including the processing and interpretation of user input and jobsite information, supplementation of user input with data queried from relevant databases, processing and analyses of jobsite information according to requisite analyses, automated generation of forms and reports for review by a reviewing entity, delivery of signed and sealed documents for process by appropriate regulatory bodies, and addition of third-party verified eSignature and/or file encryption to sign and/or seal reports and plan documents.

19 Claims, 7 Drawing Sheets

(51) Int. Cl.
  *G06F 30/13*   (2020.01)
  *H02S 20/23*   (2014.01)
  *G06Q 50/06*   (2012.01)

(56) References Cited

U.S. PATENT DOCUMENTS

| | | | | |
|---|---|---|---|---|
| 2013/0061198 | A1* | 3/2013 | Brier | G06F 3/0481 |
| | | | | 716/139 |
| 2013/0246010 | A1* | 9/2013 | Dershowitz | H02S 50/00 |
| | | | | 703/1 |
| 2014/0025343 | A1* | 1/2014 | Gregg | G06F 30/13 |
| | | | | 703/1 |
| 2015/0066442 | A1* | 3/2015 | Pryor | G06Q 10/10 |
| | | | | 703/1 |
| 2016/0140283 | A1* | 5/2016 | Morse | G06Q 50/06 |
| | | | | 716/135 |
| 2017/0091578 | A1* | 3/2017 | Ananthakrishnan | G06V 10/60 |

OTHER PUBLICATIONS

International Search Report and Written Opinion dated Dec. 5, 2022, in corresponding International Application No. PCT/US2022/047097, 8 pages.

* cited by examiner

SYSTEM AND METHOD FOR EVALUATING SOLAR INSTALLATION PLANS, STRUCTURAL AND ELECTRICAL ANALYSES, AND PERMIT PREPARATION

BACKGROUND

While the ever-decreasing prices and ever-increasing efficiencies of solar panels have been driving a boom in the renewable energy market, not every roof is capable of supporting the weight of solar panels and their accompanying infrastructure. As a result, significant amounts of time and resources are expended in order to judge whether an existing roof is suitable to bear the additional load of a solar installation, or to determine what changes must be made to that existing roof in order to comply with the relevant building codes and the like. Additionally, local weather patterns, the building materials used, the layout and truss design of the roof, and the choice of solar hardware itself complicates these determinations, as each adds another dimension of variability that must be accounted for when planning a solar installation.

As such, a system and method which can not only collect, but analyze and interpret, those inputs provided by a user, evaluate them against the relevant and applicable environmental, structural, and legal factors, and make a determination as to the suitability of the proposed installation can greatly reduce the efforts involved in planning a solar installation. This system and method can expedite the processes normally involved so that inspection and approval from a licensed structural engineer or other regulatory agency may be more readily acquired and the overall time required for permitting and the like reduced.

SUMMARY

The object of this invention is to enable a solar installation proposal to be more expediently and efficiently processed, engineered, and reviewed, reducing the overall amount of time, effort, and expense typically required to overcome the regulatory hurdles involved. The system and corresponding method interprets those inputs provided by a user, may automatically determine which analyses and data must be provided to a reviewing body, conducts the requisite analyses, and packages the results in the requisite forms and reports for delivery to a licensed engineer or similar reviewing body. Once complete, the user receives, with minimal effort, a signed and sealed copy of structural reports, plans, and permits suitable for processing by the relevant regulatory authorities.

Therefore, by automating many of the processes involved in developing plans for solar installations and by leveraging the sorts of databases described herein, the resulting plans and any corresponding reports may be developed more expediently and efficiently. Processes may be automated completely, or the system may be configured to help guide a user through the planning and review process by making context-appropriate suggestions and performing error checking and the like in real time. These aids may allow an experienced user to work more quickly, and/or these sorts of aids may also allow a less experienced user to develop a more complete and accurate work product more quickly and with less training.

Additionally, a provider or operator of the system may in turn provide or sell to customers use of the system as a service, such as on a permanent, recurring, or temporary basis. This service may be advantageously provided through a web application or other similar software delivery method which allows a user to access the system with minimal need for setup or configuration on the user's side. By using the service, the user can leverage the automated processes, linked databases, and suggestion features in order to develop their own structural and/or electrical designs for solar installations. Through the service, a user may upload/download the appropriate files as well as have their installation plans and reports reviewed by the requisite Authorities Having Jurisdiction (AHJ) or the like, where a professional engineer or registered architect licensee or otherwise appropriately supervised or credentialed personnel may conduct the necessary reviews. Then, the licensee may properly sign and/or seal the documents as may be required. The user can then download the signed and/or sealed plans, reports, and other supporting documentation as needed.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Computing devices as described herein, in addition to or in place of any further accompanying disclosure, are conceived as those devices comprising a processor, storage, and/or memory for carrying out computational tasks and/or executing computer code, instructions, and the like. Computing devices may have a user interface, such as a mouse or keyboard, touchpad, touch screen, buttons, and serial inputs—without limitation—and may include those systems which have a display device as well as those systems configured to operate in a "headless" fashion without a specific or dedicated display device. Computing devices may include, for example, desktop computers, laptop computers, cell phones, smartphones, tablets, computers on a chip, servers, cloud computing, and the like.

According to an exemplary embodiment, and referring generally to the Figures, various exemplary implementations of a method and system for generating and verifying solar installation plans and performing structural and electrical calculations and construction design or performance analyses related to the installation of photovoltaic or thermal solar panels may be disclosed.

Figure 1:
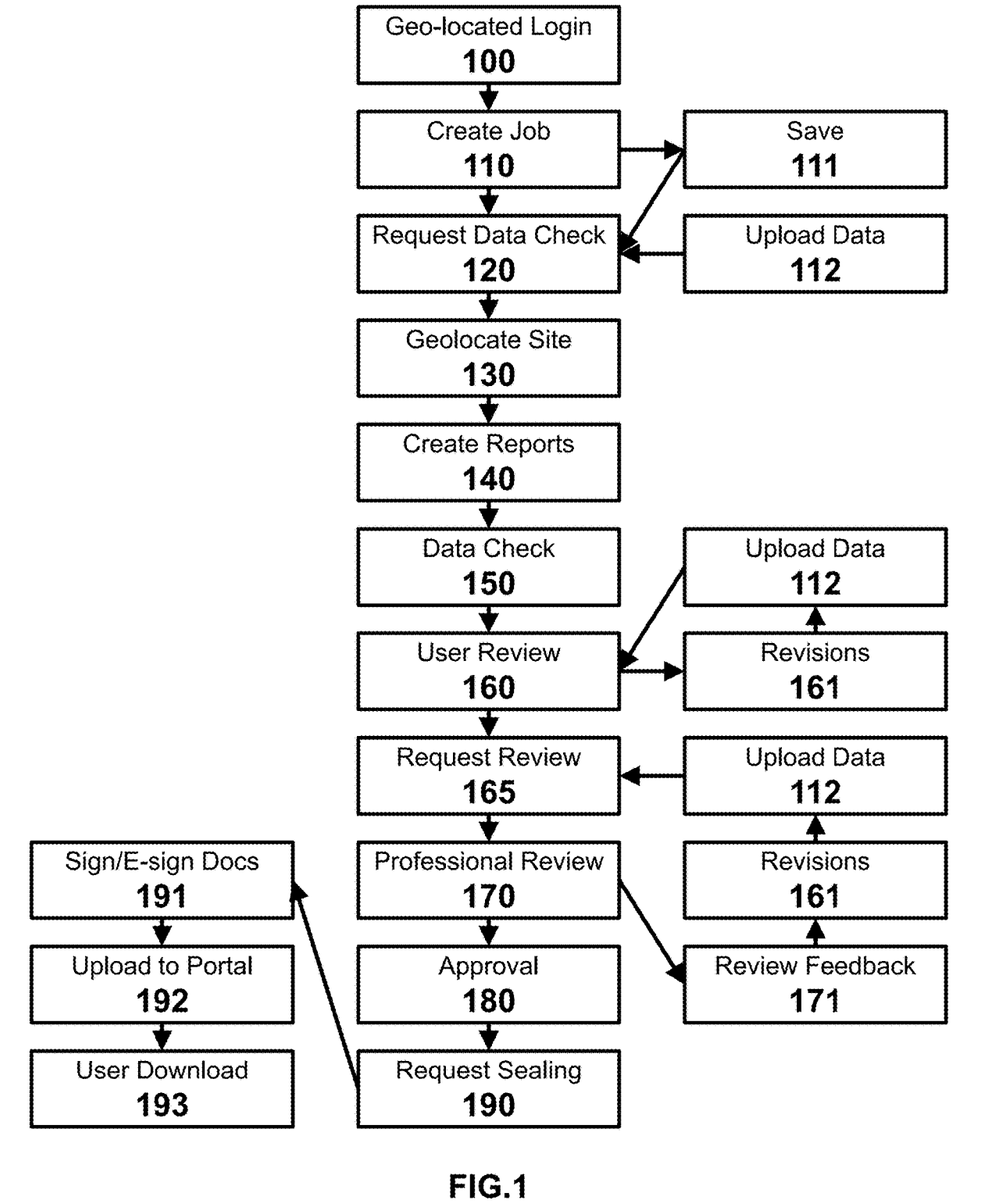
FIG. 1 depicts an exemplary process for collecting, reviewing, and generating reports for a solar installation plan.

Turning now to FIG. 1, an exemplary top-level process chart for a system and method which collects user-submitted data, processes and analyzes this data, and then creates and outputs reports for submission to and verification by a licensed engineer or an Authority Having Jurisdiction (AHJ) is shown.

The system of the present invention is preferably carried out on a server or other similar computing device which is connected to and available via the internet, such that the system may be accessed by users from any location with internet access. However, it is also understood that the system may also be operated on and through any other form of computational or communication network, such as restricted-access networks, local networks, intranets, and the like, depending on the preferences of the operator of the system.

Users may utilize login credentials, such as a username and password, two-factor authentication, and the like, to access a personalized user profile on the system. A user may be a single person, a group, or an organization. In any case, access control and privacy protections are implemented for each user profile so that only authorized user(s) and the operators of the system may access data stored within a given user profile.

When a user logs into the system, a geo-locating operation 100 may be performed to determine the location of the user. This may be achieved by conducting an IP address lookup of the user, querying any GPS devices or chips contained within the computing device (computer, laptop, tablet, smartphone or similar) the user is using to access the system, querying the internet service provider (ISP) or other service provider from which the connection is being made, querying a database of the system for location information of the user (present, historical, or otherwise), and the like. In doing so, a secondary check may be employed to ensure that the user is authorized to access the account. Additionally or alternatively, the geolocation check may be employed to determine whether a user is authorized or qualified to access a particular job contained within the user account. In some embodiments, this authorization or qualification may be limited by the relevant local building codes for the job in question. In other embodiments, this authorization or qualification may be limited by policies, preferences, and the like put in place by the user and/or organization managing the user account which governs the user profile.

In addition to or in place of the geolocation check, an identification of the user device may be carried out. Identification of the user device may include checking the IP address of the user device, a MAC address, system information, security tokens, cryptography hashes, and the like as is known in the relevant arts.

Once logged in, the user is presented with a dashboard by which a number of operations may be selected from. Notably, the user may access any number of existing jobs associated with the user account, each recorded job representing a solar panel installation which may be at any stage of planning, approval, and/or completion. A user may also choose to create a new job associated with the user account which reflects a new or existing solar panel installation.

When creating a new job 110, a user may input typical identifying information for the solar installation the user wishes to evaluate. A user may also upload or otherwise link to externally hosted data 112 and in doing so make the information available to the system. Such information might include, but is not limited to, a client's name and contact information; the user's name and contact information; the address or similar which might identify or assist in identifying the proposed location of the solar installation; job or project numbers; the type of job or solar installation proposed; the number of different framing conditions; and the like. Based on this initial information, the system may attempt to automatically populate further information relevant to the job at hand either from databases internal to the system or external databases (public and/or private).

For instance, the location of the job may be used to query relevant code databases for the specific building codes, code categories, permitting schemes, and the like which control for the location. Such codes may originate from, but are not limited to, an organizational level, a builder and/or contractor level, a municipal level, a state level, and/or a national level. Thus, one or more of the applicable building codes may be automatically populated to the current job.

Additionally or alternatively, the location of the job may be used to query relevant weather and/or climate databases to determine the relevant wind and precipitation patterns that the job's location is expected to experience in a given time frame. This weather or climate data may then be imported as is or otherwise converted to a format consistent with building codes generally or formats consistent with those specific building codes queried and determined in a previous step.

Additionally or alternatively, the location of the job may be used to query relevant geographical and/or administrative databases to determine the type of the job site, the zoning of the job site, the exposure of the job site, presence or proximity of open water or large unobstructed flat terrain, and the like which might otherwise be used to select the correct exposure classification of the site of the job. This classification may then be used either independently or in conjunction with weather and/or building code data obtained in previous steps to further populate information which is otherwise required or relevant to other analyses of the job.

Similarly, weather databases may be consulted to determine minimum and maximum temperatures of the subject site which will in turn aid in determining or selecting specific code related coefficients used in calculation and automated selection of project wire sizes, overcurrent protection devices, and the like.

Additional databases which may be consulted in order to populate the job information and/or subsequent reports may include, but are not limited to: chat, SMS, or other electronic messaging logs and/or records; project lists; and accounting databases which may contain invoice information, order lists, customer lists, part availability, and the like.

Additionally or alternatively, the information of the user and/or the user's organization may be used to pre-populate preferred or "favorited" solar installation hardware which might be used for the job.

Further job information which may be populated by the user may include: framing geometries; framing materials; roof geometries, such as roof height and/or pitch; roofing materials; other roofing features, such as chimneys, vents, exhaust pipes, and the like; solar-related equipment or equipment which may otherwise support or impact the design of the solar installations; and the like.

In those instances where one or more settings might apply, the system may present the user with a choice between those multiples of pre-populated information determined by the system. In some embodiments, it may be preferable to restrict the user to choosing between only those choices which were pre-populated by the system based on initial job information and/or organizational preferences or policies. In some embodiments, it may be preferable to restrict the user to choosing only options generally known by the system whether pre-selected or not. In other embodiments, it may be preferable to allow the user to freely choose between the information pre-populated by the system, information contained and known by the system generally but not otherwise pre-selected, and/or information entered manually by the user themselves.

On each job and for each framing condition, multiple structural analysis methods can be listed. One or more may be selected by a user as may be appropriate for the specific framing condition(s) relating to that particular roof area. The system may be configured to limit the user by only allowing appropriate methods to be selected based upon information entered, or the system may allow the user to freely select methods regardless of their appropriateness, or both. Different structural analysis methods may then be applied to different roof areas, regions, or other delineations on a particular job, as appropriate.

A user may then add structural information relevant to the job into the system. This may take the form of general site dimensions, dimensions of the structure in question, geometric layout of the roof, type of roof, location of the roof (i.e., first floor, second floor, etc.), layout and dimensions of standard framing members (i.e., dimensional lumber assembled in a configuration typically called 'stick framing), layout of roof trusses, geometric configuration of roof trusses, and the like. Such information might be enterable in a text-only format by the user, selectable or enterable via an appropriate graphic user design interface provided through the system, or imported by the user in a machine-readable format which might be exported from third party entities, or from building design and layout software known to or used by those skilled in the art.

Figure 3:
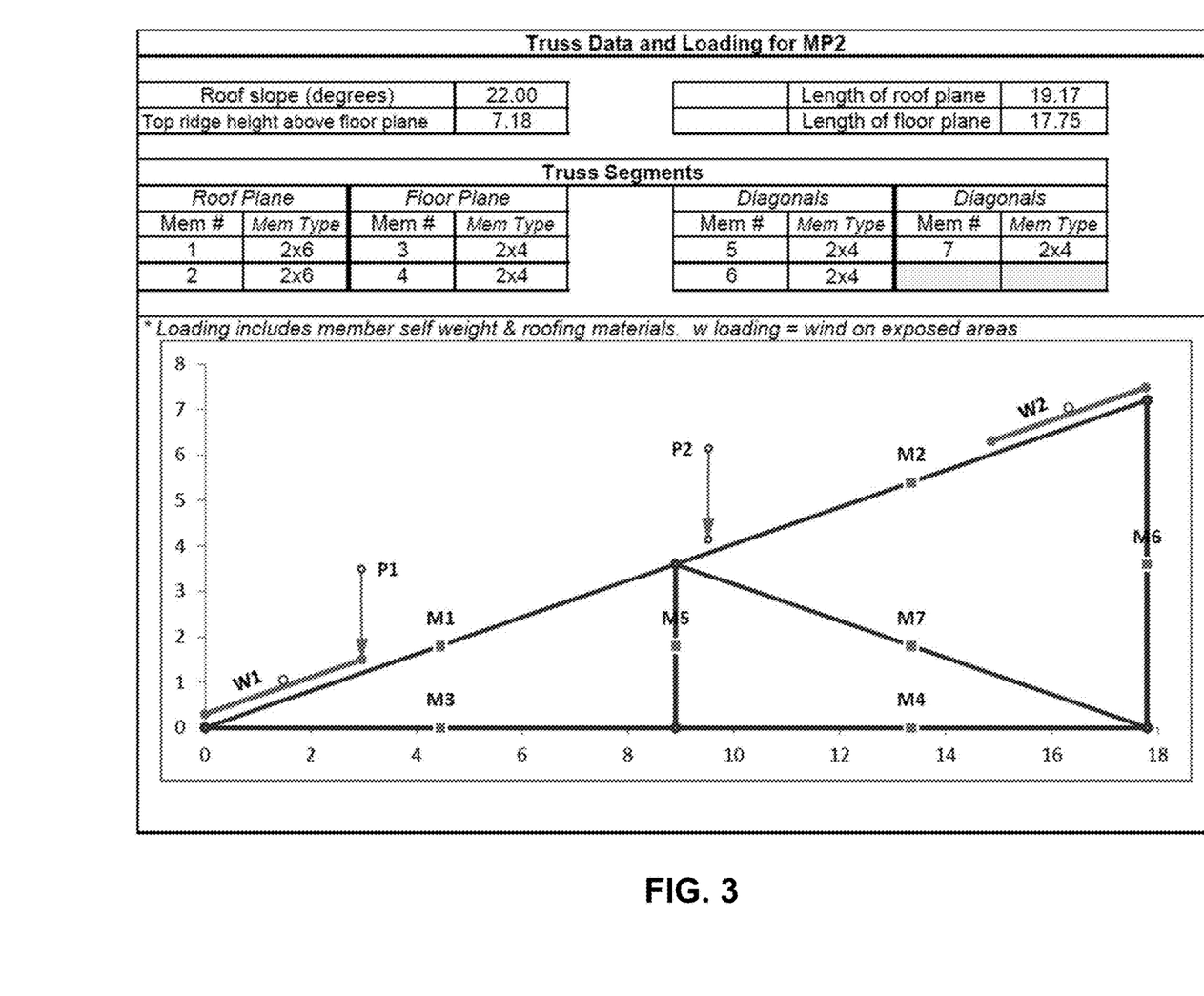
FIG. 3 depicts an exemplary truss loading diagram with exemplary input values.

For truss supported roofs, it is also preferable that the user enter in the relevant structural information both in elevation and text form, such as that described in FIG. 3. In such a format, the user draws out the truss configuration of the roof, provides the requisite material and dimensioning information for each element of the truss system, as well as provides the connectivity information for each truss element.

For stick framed roofs, it is also preferable that the user enter in the relevant structural information both in elevation and text form. In such a format, the user draws out the framing configuration of the roof and then provides the requisite material and dimensioning information for each element of the framing system.

The user then provides information relevant to the placement and attachment of the solar panel hardware, such as the panels themselves, the mounting hardware, any roof-mounted inverters and/or cabling, and the like. This information pertinent to the solar installation hardware is also indicated on the truss diagram, the stick framing diagram, and/or the roof plan view and positioned appropriately.

FIG. 3, as an exemplary embodiment, depicts a roof truss diagram comprising members M1-M7, tabulated specifics relating to the materials and dimension of the truss elements (chords) and the roof in general, as well as the locations and loads at mounting points P1 and P2 of the solar hardware, and the force loading by environmental conditions on areas W1 and W2. Different truss designs may have more or fewer chord members than shown in FIG. 3 as well as chords arranged in different configurations.

Figure 8:
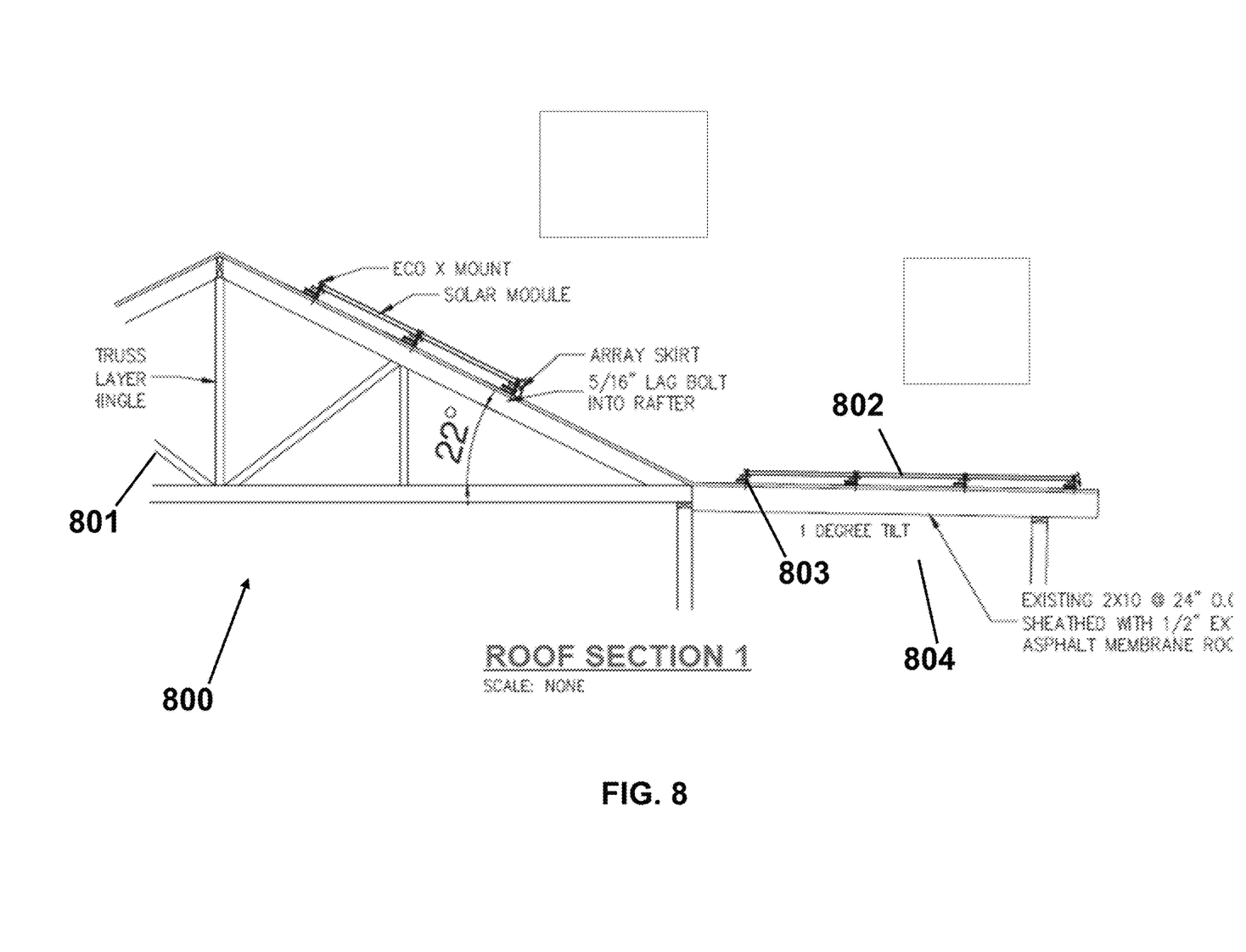
FIG. 8 depicts an exemplary framing plan for a solar installation.

Turning briefly to FIG. 8, a sample framing plan is provided displaying a truss system 801 of a roof 800, solar panels 802 to be mounted, and the location of mounting brackets 803 as they are to be affixed to the truss system 801 of this particular sample or the stick framing 804 portion of this sample.

Once a job is created, and/or during the course of creating a job, the user may save 111 the job in order to preserve those settings and information between sessions, authorized users, or switching between other jobs likewise saved by the user and/or accessible by the user.

When the user has finished inputting the job information, the user may then submit the job to the system in order to request a data check 120 of the parameters of the job. An exemplary procedure for a data check is described in FIG. 2.

Figure 2:
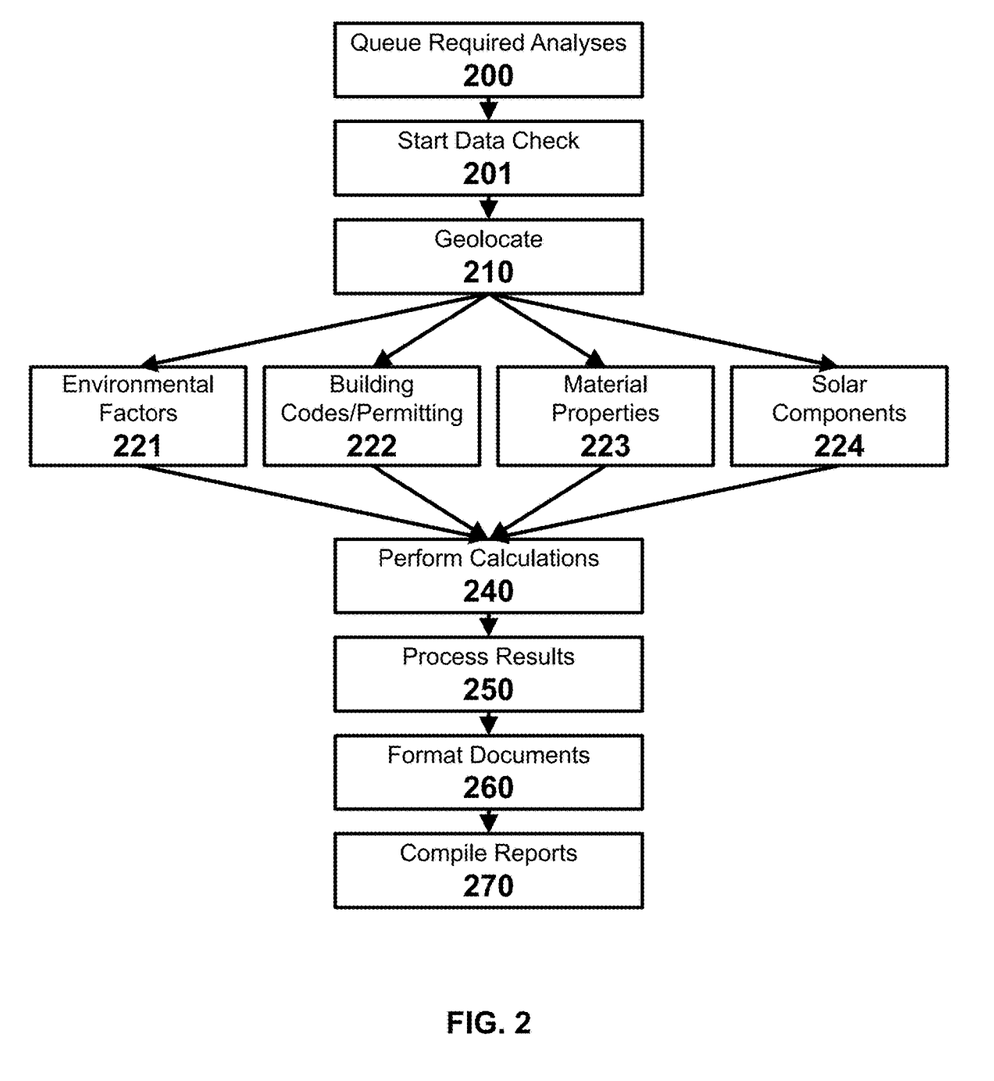
FIG. 2 depicts an exemplary process for the review of submitted data for the generation of reports for a solar installation plan.

During the course of a data check 120, a process similar to that used to pre-populate the job information may be employed. A user may queue any required analyses 200 and then initiate a data check 120, 201. A geolocation of the job and/or job site 130, 210 may be conducted to determine the location of the job, based for instance on an address of the job site, a set of GPS coordinates, a survey, parcel number, plot number, and the like. Once the site has been geolocated, relevant databases are queried to source the requisite information and requirements necessary for review, such as those containing information pertinent to local weather, climate, proximity to open water and/or flat open terrain, wind and/or snow loading, seismic conditions and other environmental factors 221; building codes and/or permitting requirements 222; material properties for construction materials used 223; and the solar installation hardware, including but not limited to the panels themselves, the mounting hardware, the inverter hardware, and the wiring/cabling required to connect the various components of the installation as well as over-current protection devices. One or more additional databases with relevant or pertinent information to the installation, permitting, and/or construction of the solar installation may also be queried in order to fashion a complete, or sufficiently complete, dataset.

The list of databases enumerated above is not exhaustive, and any number of these databases may be queried in any combination and/or in any order.

Once the required information is collected, the system makes a determination as to which analyses must be conducted in order to obtain the requisite output datasets for review. This determination may be made based upon explicit instructions and/or analyses provided in and/or indicated as required by the queried databases, for example (but not limited to) the building codes and/or permitting databases 222; based upon a list of preferred or required analyses which are stored in the user's profile, determined by the geolocated site, and/or selected by the user for a particular job; based upon an evaluation by the system which considers analyses known to the system or provided in databases (internal or external) recording such analyses, which may be used to obtain the necessary outputs using the available inputs; and/or analyses preferred or required by the system.

During the course of creating an analysis and/or a design for a project, some or all of the following may be automatically created:

(a) Determination of snow and wind loading on any particular roof plane, and the associated distributed and concentrated loads imposed upon that roof plane through the application of photovoltaic or thermal solar panels.

(b) Determination of seismic loading upon any particular roof plane from the application of photovoltaic or thermal solar panels.

(c) Determination of lift and seismic forces and associated requirements for determining appropriate fastener sizes and penetration depths into structural members or roof sheathing systems, and/or methods of fastening to metal roof components in order to properly affix photovoltaic or thermal solar panels.

(d) Stick framing structural analyses using various code requirements to check for individual member deflections and internal member stresses.

(e) Finite element analyses for truss conditions to check for both individual member deflections and internal member stresses, as well as overall deflection of truss components.

(f) Seismic analyses of both stick frame and truss assemblies with various combinations of the applied loading from photovoltaic or thermal solar panels.

(g) Electrical analyses for photovoltaic solar systems to determine code-compliant: wire sizes; solar inverters which convert direct current to alternating current; transformer designs if and where needed; over-current protection devices and/or enclosures; conduit sizing; electrical disconnects; electrical grid interconnection; battery or other energy storage systems; electrical generator sizing and interconnection; and remote and/or local electrical production monitoring systems.

(h) Results of the electrical analyses, which may be depicted in tabular format and/or graphically on the roof layout drawings, the electrical stringing diagrams, and/or the electrical diagrams discussed herein as single line or three-line diagrams.

(i) Roof layout drawings depicting the position of photovoltaic and/or thermal solar panels which would also incorporate geolocated building code compliant setbacks and other code mandated system requirements.

(j) Electrical designs and drawings for photovoltaic solar systems. Such designs/drawings may include: electrical stringing diagrams which depict how individual photovoltaic solar panels are connected together and aggregated into the solar inverters which, in turn, are connected to the building's electrical system, or electrical stringing diagrams which depict how individual photovoltaic solar panels are connected to smaller localized 'micro inverters' as well as how the micro inverters are then connected together which, in turn, then connect to a building and/or site's electrical system. The designs/drawings may also include single line and/or three line electrical diagrams. The design/drawings may also include detailed drawings depicting aspects of the electrical design which would be advantageous to highlight or emphasize for designers, contractors, installers, and the like. In any case, appropriate electrical components would be depicted, such as (but not limited to): photovoltaic solar panels, wires and/or wire sizing, solar inverters (alternating and/or direct current), transformers (if and where needed), over-current protection devices and/or enclosures, conduit sizing, system electrical disconnects, electrical grid interconnection, battery or other energy storage systems, electrical generator and associated interconnections, and remote and/or local electrical production monitoring systems.

(k) Designs and/or drawings for solar thermal systems, including the layout of the system based upon both geolocated environmental conditions and upon site-specific features such as shading or roof orientation or setbacks. These analyses may include the determination of thermal system requirements, determination of thermal system capacity based upon available suitable installation locations, as well as calculations to design some or all of the necessary components. Such components may include: heat exchangers, solar collectors, support systems, plumbing (piping, valving, and/or controls) for interconnecting system components, thermal storage components, thermal distribution and interconnection with new or existing heating/cooling devices, control systems, power designs for production monitoring systems (control systems, motors, and valves), and remote and/or local thermal production monitoring systems. As above, drawings which depict an installation's layout, interconnections, or other details which may need highlighting may be generated as deemed appropriate by the user and/or functions or rules built into the system.

For example, a site is located in Alexandria, Virginia and is identified as such based upon GPS coordinates provided to the system. The local temperature extremes, environmental snow, wind, and seismic conditions for Virginia, Fairfax County, and/or Arlington County are selected and/or retrieved from the relevant databases and populated into the system. Various geocode building code-related coefficients for at least Virginia and/or Arlington/Fairfax are drawn from their respective databases. Depending on the specifics of the sites' location and the building configuration, tailored calculations and analyses are prepared which reflect the combination of all the information compiled above in conjunction with any site-specific information that has been entered. After the appropriate calculations have been run, notifications are provided to the user that the project has been analyzed as well as whether changes are required.

Additionally or alternatively, the system may conduct a structural analysis or other calculations 240 based upon the roof structural plans provided in the job description and/or based upon the roof framing analysis selected or required. In doing so, the system may employ any of a variety of methods, including, but not limited to, standard framing structural analyses, International Building Code structural analyses, or finite element structural analyses generally, in order to evaluate the structural forces present in structural components of the roof for the job. These analyses evaluate the various trusses, elements, planes, solar hardware, and the like to determine the relevant stresses and/or displacements imposed by the addition of the solar hardware to the roof, determine whether or not these factors exceed parameters allowable by the materials, and/or determine whether or not safety factors prescribed by the system, the user, and/or set forth in the relevant building code and/or permitting databases are satisfied following addition of the solar hardware to the roof.

The system may conduct analyses regardless of the materials used, though the particular material in question may guide which specific analyses, code, or simulation is employed to carry out the analysis. The analyses may be hosted or run directly in the system, or the system may generate the appropriate files, commands, and the like necessary to run external or third-party software, codes, and the like and may further be configured to read the outputs or results of these external or third-party software, codes, and the like in order to populate the relevant information and proceed. The system may work with wood-framed structures, metal structures, composites, brick and mortar, stone block, and the like without limitation.

Once the various analyses required/requested for the job are completed, the system then processes the results 250 and makes another database query, such as (but not limited) to the building codes and/or permitting databases 222, in order to determine the requisite formatting and presentation required for the results in order to be reviewable by a licensed engineer or other similarly-situated regulatory authority. The system may also compile the results into a format 260 which highlights the information a builder, contractor, utility worker, tradesman, or the like might require in order to facilitate the installation of the solar hardware. The system may also compile the results into any format which might otherwise be accessory to or normally presented with those required or preferred formats above. Once these formats are discerned, the results are compiled and a report is generated 140, 270 which complies with these requirements.

For example, in one advantageous embodiment, the system may query those building permit forms required by a given state or municipality, identify the relevant fields within the permit form, and use the input and/or output data of the job in question to populate the permit form for inclusion in a report. The system may also generate any requisite or preferred cover sheets to accompany these permit forms.

In another advantageous embodiment, the system may create electrical calculations and design drawings for the job as well as format the output data and present it in drawing and/or tabular form for use by reviewers, buildings, contractors, and the like, said design providing sufficient information to pass AHJ permit review and to construct the project.

In another advantageous embodiment, the system may create thermal calculations and design drawings for the job and format the output data and present it in drawing and/or tabular form for use by reviewers, buildings, contractors, and the like, said design providing sufficient information to pass AHJ permit review and to construct the project.

In another advantageous embodiment, the system may query and format the output data and present it in drawing form for use by reviewers, builders, contractors, and the like. The drawings might include structural drawings of the roof as would be pertinent to the installation of the solar hardware, electrical line diagrams for the wiring and general electrical configuration of the solar installation, cutting diagrams for contractors, and the like. The system may also generate accompanying part lists, calculation tables, and the like to supplement the drawings.

In another advantageous embodiment, the system may query the various labeling and warning signs required for a given job's solar installation, such as National Electrical code labeling. The system may also superimpose these labeling requirements to indicate where such labeling and/or warnings need to be displayed in order to comply with the relevant building codes and/or permitting requirements.

In another advantageous embodiment, the system may generate invoices and/or estimates for the job based upon these results, material and component costs, and labor costs—which may likewise be stored in query-able databases, stored within the user profile, or stored within the system itself.

In another advantageous embodiment, the system may generate operational and/or administrative reports which may be used to track a job's progress through the system. Productivity metrics or other usage-based metrics may also be generated or presented as a report, said metrics based on specific users, job types, geographic areas, and any other job metrics handled by the system.

After the relevant analyses have been conducted and the requisite reports generated 140, a data check 150 is performed on the reports and their contents finalized. The outputted data and populated reports may be made available to the user for viewing and review 160. After reviewing the report and the results contained therein, the user may opt to amend or change 161 the information, drawings, or the like relevant to the job, or the user may choose to submit the reports for review 165.

When the user requests review of the reports 165, the reports are forwarded to a licensed engineer, an engineering firm, or similar regulatory body for an official review of the reports. The reviewing entity may be the owner and operator of the system, or the reviewing entity may be a third party. The user may be presented with the opportunity and/or ability to upload additional documents 112 which may be forwarded along with the request for review 165 to the reviewing body.

In those embodiments in which the reviewing entity is the owner/operator of the system, the system thus flags the jobs for which official review has been requested 165 in the system, identifying them to the reviewing entity. These flags may be viewable through an administrative account of the system or some similarly situated/specialized user-access role on the system. Either simultaneously or substantially simultaneously—within 1 minute, 10 minutes, 1 hour, 1 day, 1 business day—the system may also transmit an email, text message, notification, or other similar message/indication to a user device of the owner/operator of the system—such as a computer, laptop, cell phone, pager, specialized messaging service, or the like—as a primary or a secondary indication that a report has been flagged for official review 165.

In those embodiments in which the reviewing entity is a third party, the user may have the option to choose through the interface which reviewing entity is to receive and/or review the reports. These third party reviewing entities may likewise have a specialized user-access role on the system by which such notifications may be viewable in the system for review. Additionally or alternatively, the third party reviewing entity may likewise receive primary or secondary notifications either simultaneously or substantially simultaneously through email, text message, notification, or the like on a reviewer device.

In some advantageous embodiments, the third party reviewing entity is not necessarily granted access to the system, but merely present in the system in the form of contact information such as a name, email address, fax number, physical address, and/or the like. In those cases in which the user selects such an entity for review of the reports, the system may automatically generate the reports, any cover sheets or accompanying materials required by the third party reviewing entity, as well as any materials necessary for the transmission of such to the third party reviewing entity. The system may also facilitate the transmission of these materials to the third party reviewing entity through an online portal, email, facsimile, electronic communication, postal services, or the like.

Upon receipt of the relevant reports, the reviewing entity may then conduct the necessary reviews and prepare any feedback 171 for the user. The reviewing entity may then sign and seal 191 the documents, plans, and/or reports. The reviewing entity may also indicate that the documents, plans, and/or reports have been reviewed, found acceptable, and this approval 180 is communicated first to the user or authorized professional license holder. The authorized professional license holder may then proceed with signing and sealing the documents, plans, and/or reports 191, or the user may first review the approval 180 before requesting the documents, plans, and/or reports be signed and sealed 190. Preferably, the signing and sealing 191 of the reports occurs electronically and within the system, so that the signed and sealed reports may be expeditiously transmitted back to the user so that the user may promptly proceed with the next regulatory and/or permitting steps required for the installation of the solar installation.

Finally, the documents, plans, and/or reports—in signed or unsigned form—may be sent directly to the user via email, mail, facsimile, or the like, or the documents, plans, and/or reports. The documents, plans, and/or reports may also be uploaded to an online portal 192 from which a user may download them 193.

Figure 4:
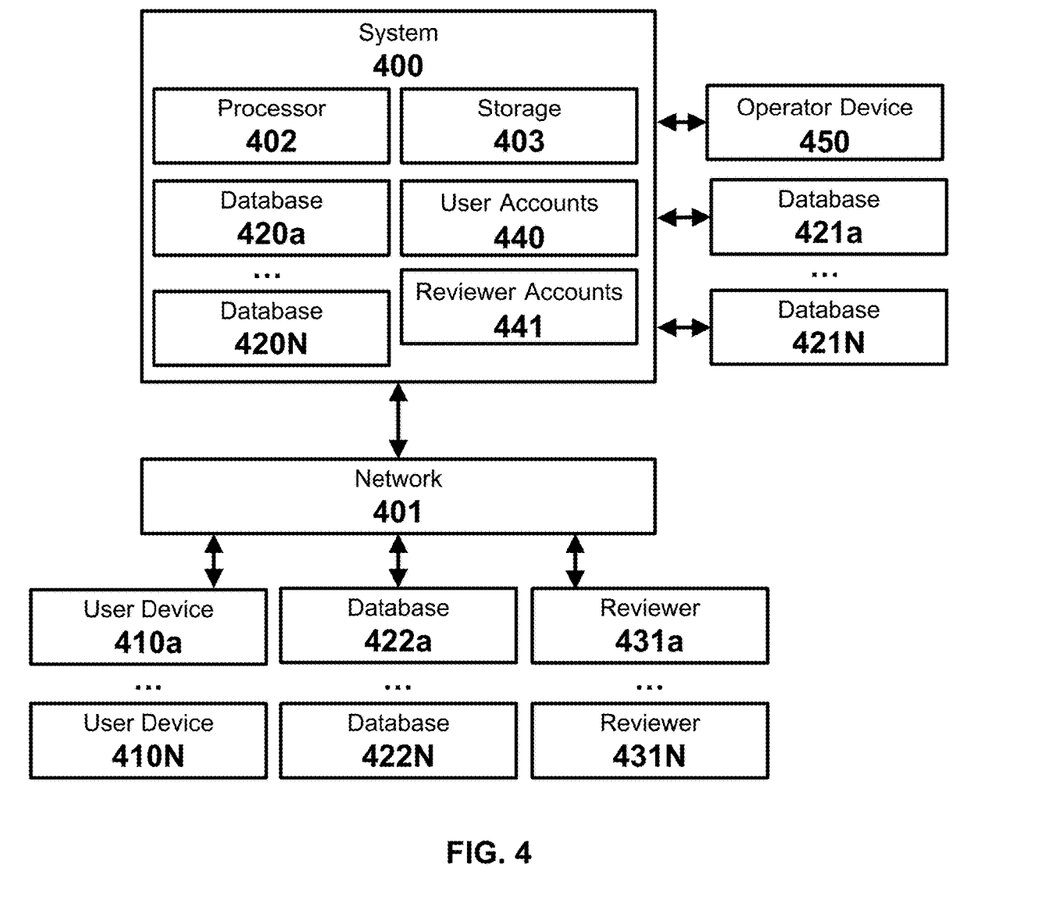
FIG. 4 depicts an exemplary network map for collecting, reviewing, and generating reports for a solar installation plan.

Turning now to FIG. 4 is an exemplary embodiment of the system of the present invention as implemented through server infrastructure.

System 400 is embodied by a server or similar computing device with which the users interact and/or the programming code which is executed by a processor 402 of the server architecture of the system 400 and stored in a non-transitory computer readable format on a storage 403 of the system 400. The system is preferably connected with a network 401, preferably the Internet, through which user devices 410a-410N may connect to and access the associated user accounts 440 present on the system 400. The reviewers 431a-431N and the owners and/or operators 450 of the system may have appropriate and corresponding reviewer accounts 441 on the system 400. However, it is also conceivable that the network 401 may be configured as a private network or closed network, such as a corporate intranet, personal home network, or the like.

Understandably, it is preferable that the owners and/or operators 450 of the system 400 retain administrative access and control over the system 400. However, in those embodiments in which the system 400 and method of the present invention are offered as a service, administrative access may be denied the licensees of the system and retained only by the licensors—or similar— of the service. While the operator device 450 is depicted as having direct access to the system 400, such access may also be possible through local networks, the internet 401, and the like.

The system may query a variety of databases, in any number and/or combination, such as those databases stored within the system itself 420a-420N, those databases connectable to the system over a local network 421a-421N, and/or internet databases 422a-422N accessible by the system through the internet 401.

In some advantageous embodiments, it may be preferable to allow a local connection to the system 400 only, in which case the user devices 410 and reviewer devices 431 would be connectable to the system 400 either directly or through a local network.

Figure 5:
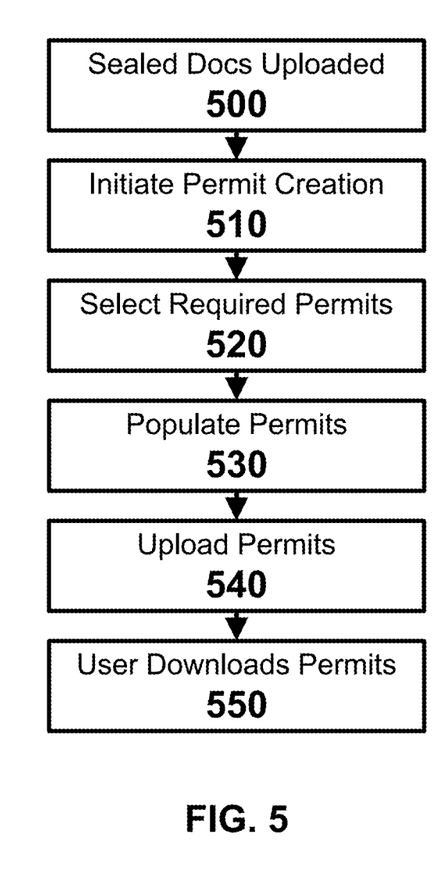
FIG. 5 depicts an exemplary method of automatically preparing permits for a project.

Turning now to FIG. 5 is an exemplary process for managing the creation of permits. Once the sealed documents have been uploaded to the portal 500 and/or otherwise recorded in the system, the user may choose to initiate the creation of permits and/or permitting requests 510 necessary for submission to the appropriate regulatory authorities. The user may choose to select the desired permits 520. The system may provide a list of all possible permits in the system, through which the user may select the appropriate ones, and the system may provide a filtered or recommended list of permits based on information stored relating to the job (such as location, job type, and the like) and information stored within the relevant databases. Once selected, the system then retrieves the appropriate permitting forms and populates the permits 530 with stored job information, information contained in the finalized reports, and the like as necessary to complete the forms. The system then uploads these permits to an online portal 540 or otherwise makes them available to the user via download, mail, email, or the like, at which point the user may receive or retrieve 550 the permits and/or permitting requests which have been prepared.

Figure 6:
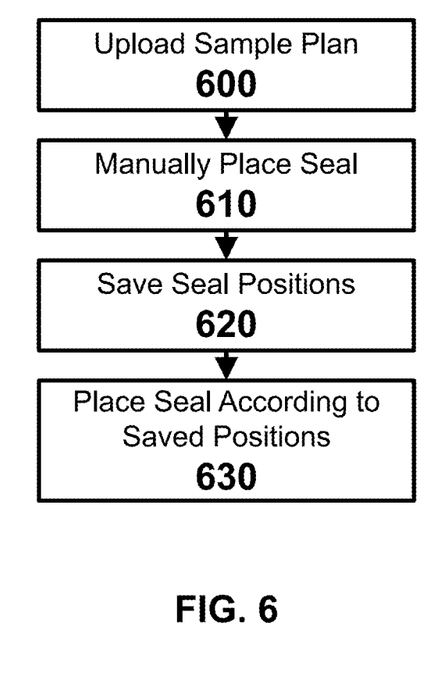
FIG. 6 depicts an exemplary method for determining placement of seals on reviewed documents.

Turning now to FIG. 6 is an exemplary process for teaching the system the proper placement of seals, stamps, and the like which may be required or desired to be appended to the various forms, permits, reports, and the like processed by the system. A user and/or operator may upload a sample plan or document 600 to the system and manually position the seal, stamp, or otherwise 610 on the document. The system may then either automatically retrieve the position information from the sample, or the user may manually enter this position information which is then saved in the system or an appropriate database 620. The seal or stamp may be a static image, text, or a combination of both which is thus appended. The seal or stamp image/text may be stored with the position information or separate therefrom to enable image files and/or text to be easily changed without the need to re-determine the positioning information. The seal or stamp image/text may also be stored in a variable format, such that the user merely designates a placeholder on the document, plan, report, or otherwise and the system inserts the correct seal or stamp image/text based on the relevant job information. A given stamp, seal, or otherwise may include multiple sets of position information relating to different layers, multiple elements, and the like, all of which may be saved and similarly recalled for a given document, report, plan, and the like.

Accordingly, when it comes time during normal operation of the system for a seal to be appended to a given document, report, plan, and the like, the seal information thus saved 620 may be recalled and used to append the relevant seals, images, text, and the like to the document 630.

In addition to the stamp or seal indicated above applied to the document, the document may also be provided with a digital signature for providing a third party digital signature verification, which may include document encryption, to ensure that the document remains unaltered after the professional has applied their seal, appropriate sealing notes, and the digital signature.

Figure 7:
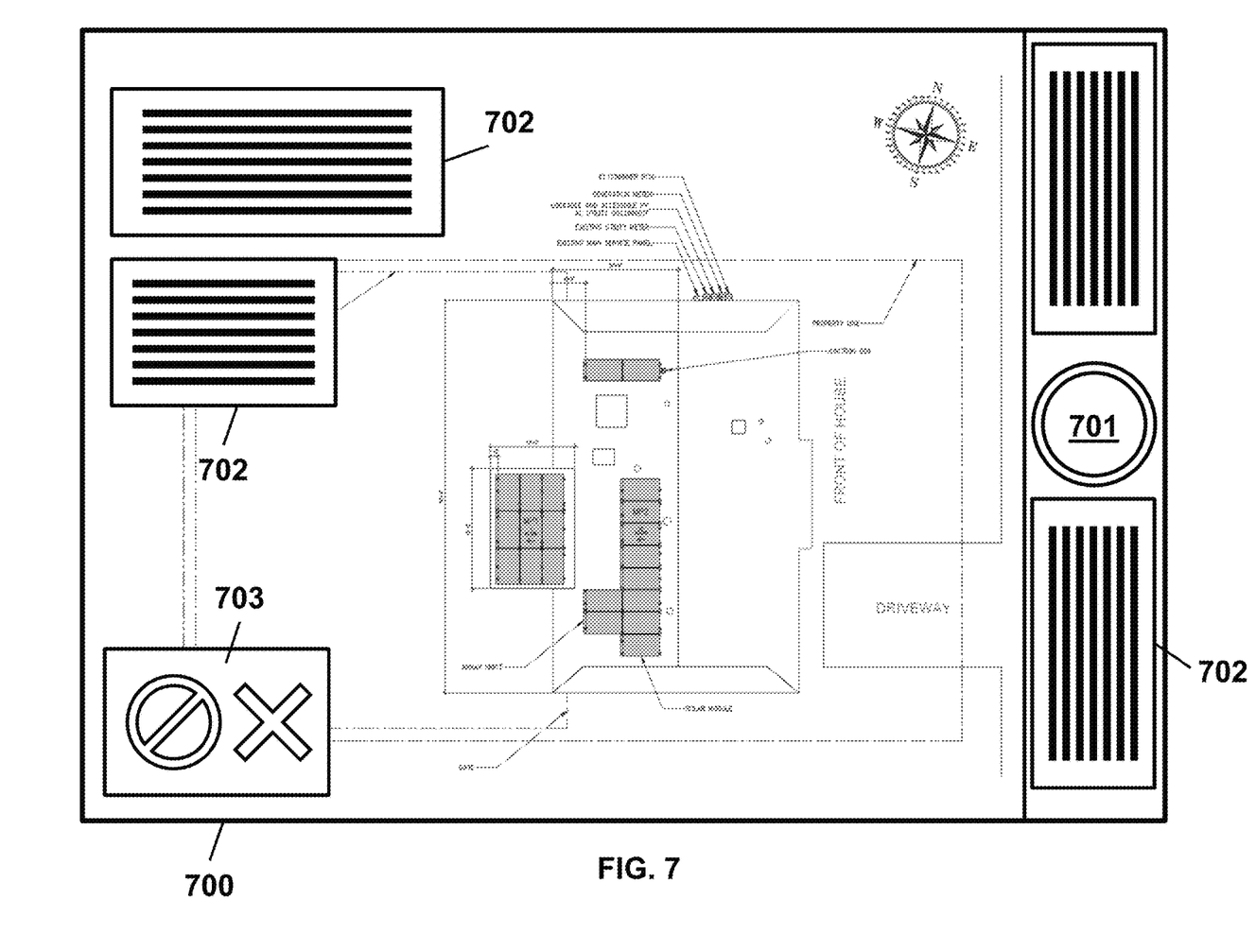
FIG. 7 depicts an exemplary report which may be prepared consistent with the foregoing disclosure.

Turning now to FIG. 7 is a sample plan or report 700 which may be output by the system, including descriptive text or indicators 702 populated by information contained within and/or retrieved by the system, any relevant warning labels 703, as well as a seal 701 applied by a reviewing authority.

In some embodiments, when warning labels or other cautionary signage is included with or required by permitting requirements or the like which are retrieved by the system, the requisite signage may be produced or generated, provided, or otherwise retrieved by the system from relevant databases and included as necessary. When regulations or otherwise require such signage to be displayed in a certain location, within a certain range of equipment, or similar, this information may likewise be included with the documents, reports, or signage thus provided. If the locations are discernable from the plans or jobsite information contained within the system for the relevant jobs, the system may indicate on the drawings or where the signage must be placed. Additionally or alternatively, a placeholder indicating a range, area of effect, or similar metric for a given sign may be included to allow a practitioner to more easily determine where a sign must be placed or whether such placement may be adjusted in view of information not present on the plans or in the jobsite information.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for creating, analyzing, reviewing, and signing solar installation designs, as-built plans, structural reports, or certifications, the system comprising:
   a server, to which a user device is connectable to access a corresponding user account for creation and/or management of at least one solar installation job, wherein the server is configured to, for each of the at least one solar installation job:
   receive job information entered through the user device describing the at least one solar installation job;
   receive, from the user device, a user login attempt, the user login attempt comprising user identification information, and associated with geolocation information, and validating the user login attempt based on at least one of the user identification information or a geolocation check;
   provide, to the user device, a plurality of operation selection options;
   receive, from the user device, a selection from among the plurality of operation selection options, and, based on the selection from the plurality of operation selection options, retrieve, from among a plurality of stored projects, a jobsite corresponding to the job information, wherein each stored project in the plurality of stored projects is associated, in the server, with a network address of at least one database associated with said stored project, and wherein, for the jobsite corresponding to the job information, the at least one database associated with the jobsite is at least one jobsite factor database for geolocated jobsite factors configured to store at least building code data;
   based on a geographic location of the jobsite, automatically query and select data from the at least one jobsite factor database for geolocated jobsite factors configured to store at least building code data, said at least one jobsite factor database being particularized to the jobsite, based on automatic matching of the jobsite to the at least one jobsite factor database based on the geographic location;
   after retrieving the geolocated jobsite factors particularized to the jobsite, determine at least one analysis required by the geolocated jobsite factors to be conducted with the job information;
   conduct at least one selected analysis, wherein the system is configured to select the at least one analysis from a plurality of multiple structural analysis methods of a roof support system based upon the geolocated jobsite factors and perform tailored calculations reflecting a combination of the geolocated jobsite factors, wherein the at least one selected analysis is selected from a set including at least: a frame structural analysis, an International Building Code structural analysis, and a finite element structural analysis;
   upon completion of the at least one selected analysis, trigger provision of at least one notification from the server to the user device;
   based on comparison of at least one analysis result to a threshold, perform one of: determining that a revision is required and triggering provision of a further notification from the server to the user device, and determining that no revision is required and triggering final processing of the at least one selected analysis;
   determine at least one report format corresponding to the geolocated jobsite factors;
   compile results of the at least one selected analysis using the at least one report format for transmission to a reviewer device;
   receive, from the reviewer device, a validated report from the reviewer device prior to final approval by an authorized professional license holder; and
   cause a device of the authorized professional license holder to automatically apply a signature and/or seal to the validated report based on stored placeholder information associated with a plan and/or report template.

2. The system of claim 1, wherein the at least one jobsite factor database further comprises at least one of: an environmental factor database, a building permitting database, a material properties database, and a solar installation component database.

3. The system of claim 1, wherein the job information comprises at least:
   a roof framing diagram which describes a roof framing and/or truss configuration; and a proposed solar installation configuration which corresponds to the roof framing and/or truss configuration.

4. The system of claim 3, wherein the at least one analysis comprises at least a structural analysis of the roof framing diagram with the proposed solar installation configuration.

5. The system of claim 1, wherein the geolocated jobsite factors comprise at least a building code for the jobsite, and wherein the at least one analysis is required by the building code.

6. The system of claim 1, wherein the server is configured to authenticate the login attempt of the user device to the server through at least the geolocation check, comprising automatically triggering the geolocation check based on the geolocation information.

7. The system of claim 6, wherein the server authenticates the login attempt of the user device by querying at least one of a GPS device of the user device, an IP address of the user device, and a device identifier of the user device.

8. The system of claim 1, wherein signing and/or sealing of the validated report further comprises
adding an electronic signature of the authorized professional license holder to the validated report, thereby encrypting the validated report to prevent further modification.

9. The system of claim 8, wherein the electronic signature is a third-party-verified eSignature.

10. A method for analyzing and processing of solar installation designs, as-built plans, structural reports, or certifications, comprising:
receiving, by a server, job information transmitted by a user device, the job information describing at least one solar installation job;
receiving, from the user device, a user login attempt, the user login attempt comprising user identification information and associated with geolocation information, and validating the user login attempt based on at least one of the user identification information or a geolocation check;
providing, to the user device, a plurality of operation selection options;
receiving, from the user device, a selection from among the plurality of operation selection options, and, based on the selection, retrieving, by the server, from among a plurality of stored projects, a jobsite corresponding to the job information, wherein each stored project in the plurality of stored projects is associated, in the server, with a network address of at least one database associated with said stored project, and wherein, for the jobsite corresponding to the job information, the at least one database associated with the jobsite is at least one jobsite factor database for geolocated jobsite factors configured to store at least building code data;
based on a geographic location of the jobsite, automatically querying, by the server, and automatically selecting data from the at least one jobsite factor database for geolocated jobsite factors configured to store at least building code data, said at least one jobsite factor database being particularized to the jobsite based on automatic matching of the jobsite to the at least one jobsite factor database based on the geographic location;
after retrieving the geolocated jobsite factors particularized to the jobsite, determining, by the server, at least one analysis required by the geolocated jobsite factors to be conducted with the job information;
conducting, by the server, the at least one selected analysis, wherein the server is configured to select the at least one analysis from a plurality of multiple structural analysis methods of a roof support system based upon the geolocated jobsite factors and perform tailored calculations reflecting a combination of the geolocated jobsite factors, wherein the at least one selected analysis is selected from a set including at least: a frame structural analysis, an International Building Code structural analysis, and a finite element structural analysis;
upon completion of the at least one selected analysis, trigger provision of at least one notification from the server to the user device;
based on comparison of at least one analysis result to a threshold, perform one of: determining that a revision is required and triggering provision of a further notification from the server to the user device, and determining that no revision is required and triggering final processing of the at least one selected analysis;
determining, by the server, at least one report format corresponding to the geolocated jobsite factors;
compiling, by the server, results of the at least one analysis into the at least one report format for transmission to a reviewer device;
receiving, by the server and from the reviewer device, a validated report containing results of the at least one analysis prior to final approval by an authorized professional license holder; and
causing a device of the authorized professional license holder to automatically apply a signature and/or seal to the validated report based on stored placeholder information associated with a plan and/or report template.

11. The method of claim 10, wherein the at least one jobsite factor database further comprises at least one of an environmental factor database, a building permitting database, a material properties database, and a solar installation component database.

12. The method of claim 10, wherein the job information comprises at least a diagram which describes a roof framing and/or truss configuration and a proposed solar installation configuration which corresponds to the roof framing and/or truss configuration.

13. The method of claim 12, wherein the at least one analysis comprises at least a structural analysis of the diagram with the proposed solar installation configuration.

14. The method of claim 10, wherein the geolocated jobsite factors comprise at least a building code for the jobsite, and wherein the at least one analysis is required by the building code.

15. The method of claim 10, further comprising:
authentication, by the server, of the login attempt of the user device to the server through at least the geolocation check, comprising automatically triggering the geolocation check based on the geolocation information.

16. The method of claim 15, wherein the server authenticates the login attempt of the user device by querying at least one of a GPS device of the user device, an IP address of the user device, and a device identifier of the user device.

17. The method of claim 10, wherein signing and/or sealing the validated report further comprises:
adding an electronic signature of the authorized professional license holder to the validated report, thereby encrypting the validated report to prevent further modification.

18. The method of claim 17, wherein the electronic signature is a third-party-verified eSignature.

19. A non-transitory computer-readable storage medium containing instructions executable by a processor for carrying out the method of claim 10.

\* \* \* \* \*